(12) United States Patent
Yochai et al.

(10) Patent No.: US 8,788,754 B2
(45) Date of Patent: *Jul. 22, 2014

(54) VIRTUALIZED STORAGE SYSTEM AND METHOD OF OPERATING THEREOF

(75) Inventors: Yechiel Yochai, D.N. Menashe (IL); Leo Corry, Ramat Gan (IL); Haim Kopylovitz, Herzliya (IL)

(73) Assignee: Infinidat Ltd., Herzliya (IL)

( * ) Notice: Subject to any disclaimer, the term of this patent is extended or adjusted under 35 U.S.C. 154(b) by 83 days.

This patent is subject to a terminal disclaimer.

(21) Appl. No.: 13/208,044

(22) Filed: Aug. 11, 2011

(65) Prior Publication Data

US 2012/0066450 A1     Mar. 15, 2012

Related U.S. Application Data

(63) Continuation of application No. PCT/IL2010/000124, filed on Feb. 11, 2010.

(60) Provisional application No. 61/248,462, filed on Oct. 4, 2009, provisional application No. 61/151,533, filed on Feb. 11, 2009.

(51) Int. Cl.
| | |
|---|---|
| *G06F 12/08* | (2006.01) |
| *G06F 12/10* | (2006.01) |
| *G06F 12/02* | (2006.01) |
| *G06F 3/06* | (2006.01) |
| *G06F 11/14* | (2006.01) |

(52) U.S. Cl.
CPC .............. *G06F 12/10* (2013.01); *G06F 3/0689* (2013.01); *G06F 3/0665* (2013.01); *G06F 12/109* (2013.01); *G06F 11/1448* (2013.01)
USPC ........... 711/114; 711/203; 711/170; 711/206; 711/162; 711/E12.002; 711/E12.058; 711/E12.016

(58) Field of Classification Search
None
See application file for complete search history.

(56) References Cited

U.S. PATENT DOCUMENTS

| | | |
|---|---|---|
| 5,392,244 A | 2/1995 | Jacobson et al. |
| 6,889,309 B1 | 5/2005 | Oliveira et al. |
| 6,898,670 B2 | 5/2005 | Nahum |
| 6,996,582 B2 | 2/2006 | Daniels et al. |
| 7,124,275 B2 | 10/2006 | Gammel et al. |

(Continued)

OTHER PUBLICATIONS

U.S. Appl. No. 13/208,150, filed Aug. 11, 2011 in the name of Yechiel Yochai et al.

(Continued)

*Primary Examiner* — Denise Tran
(74) *Attorney, Agent, or Firm* — Oren Reches

(57) ABSTRACT

A storage system and method is provided including physical storage devices controlled by storage control devices constituting a storage control layer operatively coupled to the physical storage devices and hosts. The storage control layer includes: a first virtual layer interfacing with the hosts, operable to represent a logical address space characterized by logical block addresses and available to said hosts and characterized by an Internal Virtual Address Space (IVAS) and operable, responsive to a configuration or I/O request addressed to the logical block addresses, to translate said logical block addresses into IVAS addresses; and a second virtual layer interfacing with the physical storage devices, operable to represent an available physical space to said hosts and characterized by a Physical Virtual Address Space (PVAS), addresses in PVAS having corresponding address in IVAS. The second virtual layer is operable to translate said respective IVAS addresses into addresses in the physical address space.

14 Claims, 5 Drawing Sheets

(56) References Cited

U.S. PATENT DOCUMENTS

| | | |
|---|---|---|
| 7,386,697 B1 | 6/2008 | Case et al. |
| 2006/0184565 A1 | 8/2006 | Nishikawa et al. |
| 2007/0101083 A1 | 5/2007 | Ogihara et al. |
| 2007/0150690 A1 | 6/2007 | Chen et al. |
| 2008/0104359 A1 | 5/2008 | Sauer et al. |
| 2008/0270694 A1 | 10/2008 | Patterson et al. |
| 2009/0125680 A1* | 5/2009 | Ninose et al. ............ 711/114 |
| 2010/0153617 A1 | 6/2010 | Miroshnichenko et al. |
| 2012/0072694 A1* | 3/2012 | Yochai et al. ............ 711/170 |

OTHER PUBLICATIONS

U.S. Appl. No. 13/208,042, filed Aug. 11, 2011 in the name of Yechiel Yochai et al.

U.S. Appl. No. 12/544,743, filed Aug. 20, 2009 in the name of Winokur et al.

* cited by examiner

VIRTUALIZED STORAGE SYSTEM AND METHOD OF OPERATING THEREOF

CROSS-REFERENCES TO RELATED APPLICATIONS

This application is a continuation application of PCT application No. PCT/IL2010/000124, filed on Feb. 11, 2010 and claiming priority from U.S. Provisional Patent Application No. 61/151,533 filed on Feb. 11, 2009 and U.S. Provisional Patent Application No. 61/248,462 filed on Oct. 4, 2009, all applications incorporated herein by reference in their entirety.

FIELD OF THE INVENTION

The present invention relates, in general, to data storage systems and respective methods for data storage, and, more particularly, to virtualized storage system and virtualized storage system operational methods.

BACKGROUND OF THE INVENTION

Growing complexity of storage infrastructure requires solutions for efficient use and management of resources. Storage virtualization enables administrators to manage distributed storage as if it were a single, consolidated resource. Storage virtualization helps the storage administrator to perform the tasks of resource allocation, backup, archiving and recovery more easily and in less time, by disguising the actual complexity of the storage systems (including storage network systems).

The virtualized storage system presents to the user a logical space for data storage and itself handles the process of mapping it to the actual physical location. The virtualized storage system may include modular storage arrays and a common virtual storage space enabling organization of the storage resources as a single logical pool available to users under a common management. For further fault tolerance, the storage systems may be designed as spreading data redundantly across a set of storage-nodes and enabling continuous operating when a hardware failure occurs. Fault tolerant data storage systems may store data across a plurality of disc drives and may include duplicate data, parity or other information that may be employed to reconstruct data if a drive fails.

The problems of mapping between logical and physical data addresses in virtualized storage systems have been recognized in the Prior Art and various systems have been developed to provide a solution, for example:

U.S. Pat. No. 5,392,244 (Jacobson et al.) discloses a method for managing data on a disk array, comprising the following steps: providing physical storage space on a disk array of plural disks; mapping the physical storage space into a first virtual storage space having first and second RAID areas, the first RAID area having first allocation blocks for holding data according to a first RAID level and the second RAID area having second allocation blocks for holding data according to a second RAID level; mapping the first virtual storage space into a second virtual storage space having multiple virtual blocks, the first and second virtual blocks being associated with the first and second allocation blocks in respective RAID areas via a virtual block table; selecting a first virtual block associated with a first allocation block in a first RAID area; locating a second allocation block in a second RAID area; transferring selected data from said first allocation block to said second allocation block so that the selected data once stored according to the first RAID level is now stored according to the second RAID level; and modifying the virtual block table to reflect the transfer data to the second RAID area.

U.S. Pat. No. 6,889,309 (Oliveira et al.) discloses a method and apparatus for managing a virtual data storage object in a computer system including at least one host and at least one storage device that present at least one storage disk to the host as a storage resource. The host includes at least one of an LVM and a file system. The virtual data storage object is created so that at least one of a logical volume and a file is employed as a storage resource to store data stored to the virtual data storage object. Another embodiment forms a virtual data storage object with data images stored on logical volumes from LVMs on different hosts. A further embodiment forms a virtual data storage object with one data image stored to a disk and another stored to a logical volume. Another embodiment is directed to a method and apparatus for distributing the metadata that defines a virtual storage object about the computer system.

U.S. Pat. No. 6,898,670 (Nahum) discloses a distributed architecture for the virtualization of storage capacity in a Storage Area Network (SAN) and for the management of virtual and physical memory. There is provided a virtualization software computer program consisting of two portions, namely virtualization and translation, each portion residing in a different location but both portions operating interactively. A SAN coupling an array of hosts via a Network Switch to an array of storage devices is equipped with a Storage Virtualization Manager. The SVM operating the virtualization computer software handles physical storage capacity virtualization and metadata management. The Network Switch routes storage I/O operations between the hosts and the storage devices, while the translation software resides in a processor, in either a host or elsewhere on the Network Switch SAN. Although the Network Switch and the SVM decouple tasks to relieve load and prevent bottlenecks, practical implementation permits to design the Network Switch, the processor(s) operating the virtualization program, and the SVM in many configurations spanning from distributed to integrated packaging. The virtualization software also supports real time configuration adaptation of changes occurring in the configuration of the array of hosts and of storage devices of the SAN.

U.S. Pat. No. 6,996,582 (Daniels et al.) discloses a virtual storage system and operational method thereof. The virtual storage system includes a physical storage space configured to store data, a virtual storage space adapted to provide a representation of data stored within the physical storage space to a host, a memory configured to store a plurality of pointers utilized to implement addressing intermediate the physical storage space and the virtual storage space, and a controller configured to extract selected ones of the pointers from the memory and to provide the selected pointers in another storage location different than the memory at a first moment in time and to extract the selected pointers from the another storage location and to provide the selected pointers in the memory at a second moment in time subsequent to the first moment in time.

U.S. Pat. No. 7,124,275 (Gammel et al.) discloses a method for determining a physical address from a virtual address, wherein a mapping regulation between the virtual address and the physical address is implemented as a hierarchical tree structure with compressed nodes. First, a compression indicator included in the mapping regulation is read, and a portion of the virtual address associated with the considered node level is read. Using the compression indicator and the portion of the virtual address, an entry in the node list of the considered node is determined. The determined entry is read, where-upon the physical address can be determined directly, if the considered node level has been the hierarchically lowest node level. If higher node levels to be processed are present, the previous steps in determining the physical address for compressed nodes of lower hierarchy level are repeated until the hierarchically lowest node level is reached.

U.S. Pat. No. 7,386,697 (Case et al.) discloses a virtual memory system, wherein address translation information is provided using a cluster that is associated with some range of virtual addresses and that can be used to translate any virtual address in its range to a physical address. The sizes of the ranges mapped by different clusters may be different. Clusters are stored in an address translation table that is indexed by a virtual address so that, starting from any valid virtual address, the appropriate cluster for translating that address can be retrieved from the translation table. The clusters are dynamically created from a fragmented pool of physical addresses as new virtual address mappings are requested by consumers of the virtual memory space.

US Patent Application No. 2007/101,083 (Ogihara et al.) discloses a virtual storage system control apparatus comprising a plurality of storage device control sections that assign virtual volumes to the storage devices of the virtual storage clusters, generate information on the virtual volumes, set up a link between the virtual volumes of the own virtual storage clusters and the virtual volumes of other virtual storage clusters by way of the network and copy data on the basis of the link and a management node that directs a move of a virtual volume by having the link set up according to the information on the virtual volumes.

SUMMARY OF THE INVENTION

In accordance with certain aspects of the present invention, there is provided a storage system comprising a plurality of physical storage devices controlled by a plurality of storage control devices constituting a storage control layer, said layer operatively coupled to the plurality of physical storage devices and a plurality of hosts. The storage control layer comprises: a) a first virtual layer interfacing with the plurality of hosts, operable to represent a logical address space characterized by logical block addresses and available to said plurality of hosts, said first virtual layer characterized by an Internal Virtual Address Space (IVAS); b) a second virtual layer interfacing with the plurality of physical storage devices, operable to represent an actual physical space available to said plurality of hosts and characterized by a Physical Virtual Address Space (PVAS); and c) an allocation module operatively coupled to the first virtual layer and to the second virtual layer and operable to provide mapping between Internal Virtual Address Space and Physical Virtual Address Space wherein each address in said Physical Virtual Address Space has at least one corresponding address in said Internal Virtual Address Space. A range of addresses in IVAS may be substantially larger than a range of addresses in PVAS. PVAS may be further configured to represent a concatenation RAID Groups distributed over the storage devices.

In accordance with further aspects of the present invention, Internal Virtual Address Space and Physical Virtual Address Space may be managed independently of each other, for example, with the help of independently handled an IVAS allocation table and a PVAS allocation table.

In accordance with further aspects of the present invention, the storage system of is further configured, responsive to configuring a logical volume, to allocate respective addresses in IVAS. Responsive to allocating a certain range of addresses in IVAS, the storage system is further configured to book the respective space in PVAS, thereby accounting this space as unavailable. The storage system is further configured to allocate respective range of physical storage addresses responsive to a write request. The storage system may be further operable to dynamically allocate address space in PVAS responsive to a write request corresponding to respective addresses allocated in IVAS.

In accordance with further aspects of the present invention, a plurality of addresses in the IVAS may correspond to one and the same address in the PVAS.

In accordance with further aspects of the present invention, a source object and its at least one snapshot may be configured to be allocated to different addresses in IVAS, while sharing the same allocated addresses in the PVAS until either the source object or the respective snapshot are modified by a write request.

In accordance with further aspects of the present invention, the first virtual layer is further operable, responsive to an I/O request addressed to one or more logical block addresses, to provide protocol-dependent translation to respective IVAS addresses, thereby facilitating the second virtual layer and the physical storage space to be configured to operate in a protocol-independent manner.

In accordance with further aspects of the present invention, the storage system may be further configured as a plurality of virtual partitions, wherein at least two virtual partitions are operable in accordance with different storage protocols and/or configured with different protection schemes.

In accordance with further aspects of the present invention, the storage system is further operable, in response to a request to delete a logical object or part thereof represented by a range of contiguous addresses in IVAS, to configure said range of contiguous addresses as deleted, whereas to keep metadata characterizing said range in IVAS and PVAS unchanged, thereby enabling instant un-delete of said range if required. The metadata may be kept in accordance with a pre-defined policy.

In accordance with other aspects of the present invention, there is provided a storage system comprising a plurality of physical storage devices controlled by a plurality of storage control devices constituting a storage control layer, said layer operatively coupled to the plurality of physical storage devices and a plurality of hosts. The storage control layer comprises: a) a first virtual layer interfacing with the plurality of hosts, operable to represent a logical address space characterized by logical block addresses and available to said plurality of hosts, said first virtual layer characterized by Internal Virtual Address Space (IVAS) and further operable, responsive to a configuration or I/O request addressed to one or more logical block addresses, to provide a translation of said logical block addresses into respective IVAS addresses; and b) a second virtual layer interfacing with the plurality of physical storage devices, operable to represent an actual physical space available to said plurality of hosts and characterized by a Physical Virtual Address Space (PVAS), wherein each address in said Physical Virtual Address Space has at least one corresponding address in the Internal Virtual Address Space; and wherein said second virtual layer is operable to provide further translation of said respective IVAS addresses into addresses in physical address space. By way of non-limiting example, the configuration request may be a request for adding one or more new hosts to said plurality of hosts; a request for disconnecting one or more hosts among said plurality of hosts; a request for generating one or more new snapshots; a request for changing status of exported volumes, etc. The configuration request may be provided with no changes in meta-data related to the addressed logical blocks and be handled in the second virtual layer and/or in the physical storage space.

In accordance with further aspects of the present invention, the translation of logical block addresses into respective IVAS addresses may be provided in a protocol-dependent manner and further translation of said respective IVAS addresses into addresses in physical address space is provided in a protocol-independent manner.

In accordance with further aspects of the present invention, the storage system may be further configured as a plurality of virtual partitions, wherein at least two virtual partitions are operable in accordance with different storage protocols and/or configured with different protection schemes.

In accordance with further aspects of the present invention, the storage system is further operable to configure a new logical unit with a desired protection scheme by assigning a virtual partition pre-configured in accordance with said desired protection scheme.

In accordance with further aspects of the present invention, the storage system may be further operable to assign resources required for the desired protection scheme responsive to configuring a new logical unit.

In accordance with further aspects of the present invention, the storage system may be further operable, in response to a request to delete a logical object or part thereof represented by a range of contiguous addresses in IVAS, to configure said range of contiguous addresses as deleted, whereas to keep metadata characterizing said range in IVAS and PVAS unchanged, thereby enabling instant un-delete of said range if required.

In accordance with other aspects of the present invention, there is provided a storage system comprising a plurality of physical storage devices controlled by a plurality of storage control devices constituting a storage control layer, said layer operatively coupled to the plurality of physical storage devices and a plurality of hosts. The storage control layer comprises: a) a first virtual layer interfacing with the plurality of hosts, operable to represent a logical address space characterized by logical block addresses and available to said plurality of hosts, said first virtual layer characterized by an Internal Virtual Address Space (IVAS) and further operable, responsive to IO requests addressed to one or more logical block addresses, to provide protocol-dependent translation of said logical block addresses into respective IVAS addresses; and b) a second virtual layer interfacing with the plurality of physical storage devices, operable to represent an, actual physical space available to said plurality of hosts and characterized by a Physical Virtual Address Space (PVAS), wherein each address in said Physical Virtual Address Space has at least one corresponding address in the Internal Virtual Address Space; and wherein said second virtual layer is operable, to provide further translation of said respective IVAS addresses into addresses in physical address space, said translation provided in a protocol-independent manner.

In accordance with other aspects of the present invention, there is provided a method of operating a storage system comprising a plurality of physical storage devices controlled by a plurality of storage control devices constituting a storage control layer, said layer operatively coupled to the plurality of physical storage devices and a plurality of hosts. The method comprises: a) generating in the storage control layer a first virtual layer interfacing with the plurality of hosts and characterized by a Internal Virtual Address Space (IVAS), and a second virtual layer interfacing with the plurality of physical storage devices and characterized by Physical Virtual Address Space (PVAS); b) representing, with the help of the first virtual layer, logical address space characterized by logical block addresses and available to said plurality of hosts, and representing, with the help of the second virtual layer, actual physical space available to said plurality of hosts; and c) providing mapping between Internal Virtual Address Space and Physical Virtual Address Space via an allocation module operatively coupled to the first virtual layer and to the second virtual layer, wherein each address in said Physical Virtual Address Space has at least one corresponding address in the Internal Virtual Address Space.

In accordance with further aspects of the present invention, the method may further comprise: a) generating at least one snapshot with respect to a source object; b) allocating to said at least one snapshot and said source object different addresses in IVAS, whilst allocating common addresses in the PVAS; and c) responsive to modification of said source object or said snapshot by a respective write request, allocating new addresses in PVAS to, respectively, the modified source object or the modified snapshot. The method may further comprise dynamic allocating of address space in PVAS responsive to a write request corresponding to respective addresses allocated in IVAS.

In accordance with further aspects of the present invention, the method may further comprise: responsive to an I/O request addressed to one or more logical block addresses, providing, with the help of the first virtual layer, protocol-dependent translation to respective IVAS addresses, thereby facilitating the second virtual layer and the physical storage space to operate in a protocol-independent manner.

In accordance with further aspects of the present invention, the method may further comprise: a) in response to a request to delete a logical object or part thereof represented by a range of contiguous addresses in IVAS, executing an atomic process comprising de-allocation of said range in IVAS; and b) executing a background process comprising de-allocation of addresses in PVAS corresponding to the de-allocated range in IVAS. The background process may be provided with a delay, thereby enabling instant un-delete of said range if required before starting the background process. In response to a request to delete a non-allocated at physical level snapshot or thin volume represented by a range of contiguous addresses in IVAS, the method may further comprises executing an atomic process comprising de-allocation of said range in IVAS whilst keeping PVAS and/or physical storage space unchanged.

In accordance with other aspects of the present invention, there is provided a method of operating a storage system comprising a plurality of physical storage devices controlled by a plurality of storage control devices constituting a storage control layer, said layer operatively coupled to the plurality of physical storage devices and a plurality of hosts. The method comprises: a) generating in the storage control layer a first virtual layer interfacing with the plurality of hosts and characterized by an Internal Virtual Address Space (IVAS), and a second virtual layer interfacing with the plurality of physical storage devices and characterized by Physical Virtual Address Space (PVAS); b) representing, with the help of the first virtual layer, logical address space characterized by logical block addresses and available to said plurality of hosts; c) representing, with the help of the second virtual layer, an actual physical space available to said plurality of hosts, wherein each address in said Physical Virtual Address Space has at least one corresponding address in the Internal Virtual Address Space; d) responsive to a configuration or I/O request addressed to one or more logical block addresses, to translating said logical block addresses into respective IVAS addresses; and e) translating said respective IVAS addresses into addresses in physical address space. Translating logical block addresses into respective IVAS addresses may be provided in a protocol-dependent manner, while translating said respective IVAS addresses into addresses in physical address space may be provided in a protocol-independent manner.

The configuration request may be provided with no changes in meta-data related to the addressed logical blocks and handled in the second virtual layer and/or in the physical storage space.

In accordance with further aspects of the present invention, the method may further comprise: a) in response to a request to delete a logical object or part thereof represented by a range of contiguous addresses in IVAS, executing an atomic process comprising de-allocation of said range in IVAS; and b) executing a background process comprising de-allocation of addresses in PVAS corresponding to the de-allocated range in IVAS. In response to a request to delete a non-allocated at physical level snapshot or thin volume represented by a range of contiguous addresses in IVAS, the method may further comprise executing an atomic process comprising de-allocation of said range in IVAS whilst further keeping PVAS and/or physical storage space unchanged.

Among advantages of certain embodiments of the present invention is enabling more efficient and smooth interaction between a very large amount of Logical Objects and much smaller amount of actual physical storage data blocks. Among further advantages of certain embodiments of the invention is capability of simultaneous support of various storage protocols, as well as efficient implementations of additional functionalities in the storage system as, for example, virtual deletion of Logical Objects including snapshots.

BRIEF DESCRIPTION OF THE DRAWINGS

In order to understand the invention and to see how it may be carried out in practice, embodiments will now be described, by way of non-limiting example only, with reference to the accompanying drawings, in which.

DETAILED DESCRIPTION OF EMBODIMENTS

Figure 1:
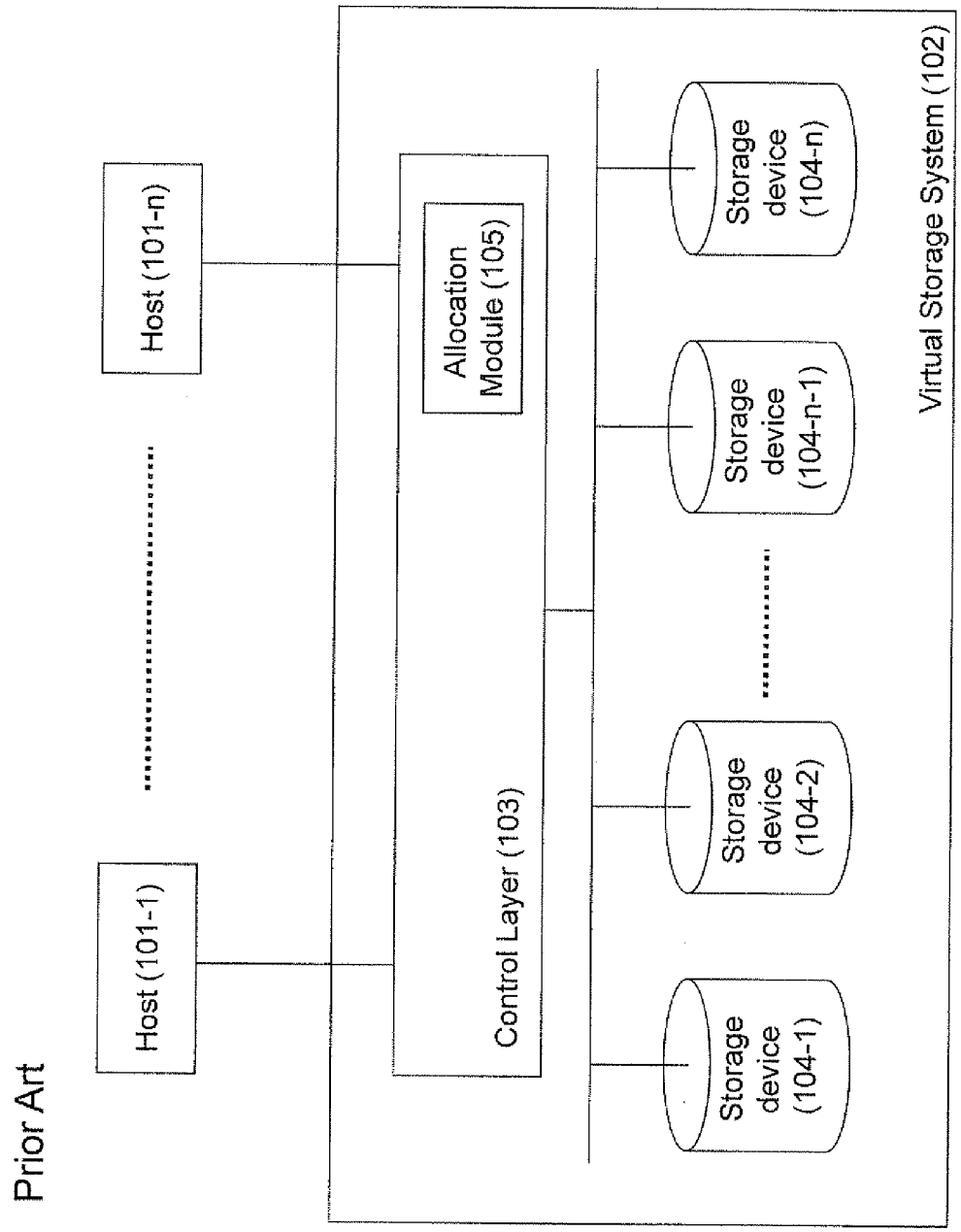
FIG. 1 illustrates a schematic functional block diagram of a computer system with virtualized storage system as known in the art.

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention. In the drawings and descriptions, identical reference numerals indicate those components that are common to different embodiments or configurations.

Unless specifically stated otherwise, as apparent from the following discussions, it is appreciated that throughout the specification discussions utilizing terms such as "processing", "computing", "calculating", "determining", "generating", "activating", "reading", "writing", "classifying", "allocating", "storing", "managing" or the like, refer to the action and/or processes of a computer that manipulate and/or transform data into other data, said data represented as physical, such as electronic, quantities and/or representing the physical objects. The term "computer" should be expansively construed to cover any kind of electronic system with data processing capabilities, including, by way of non-limiting example, personal computers, servers, computing system, communication devices, storage devices, processors (e.g. digital signal processor (DSP), microcontrollers, field programmable gate array (FPGA), application specific integrated circuit (ASIC), etc.) and other electronic computing systems.

The operations in accordance with the teachings herein may be performed by a computer specially constructed for the desired purposes or by a general purpose computer specially configured for the desired purpose by a computer program stored in a computer readable storage medium.

Embodiments of the present invention are not described with reference to any particular programming language. It will be appreciated that a variety of programming languages may be used to implement the teachings of the inventions as described herein.

The references cited in the background teach many principles of storage virtualization that are applicable to the present invention. Therefore the full contents of these publications are incorporated by reference herein for appropriate teachings of additional or alternative details, features and/or technical background.

Bearing this in mind, attention is drawn to FIG. 1 illustrating an exemplary virtualized storage system as known in the art.

The computer system comprises a plurality of host computers (workstations, application servers, etc.) illustrated as 101-1-101-$n$ sharing common storage means provided by a virtualized storage system 102. The storage system comprises a storage control layer 103 comprising one or more appropriate storage control devices operatively coupled to the plurality of host computers and a plurality of data storage devices 104-1-104-$n$ constituting a physical storage space optionally distributed over one or more storage nodes, wherein the storage control layer is operable to control interface operations (including I/O operations) therebetween. The storage control layer is further operable to handle a virtual representation of physical storage space and to facilitate necessary mapping between the physical storage space and its virtual representation. The virtualization functions may be provided in hardware, software, firmware or any suitable combination thereof. Optionally, the functions of the control layer may be fully or partly integrated with one or more host computers and/or storage devices and/or with one or more communication devices enabling communication between the hosts and the storage devices. Optionally, a format of logical representation provided by the control layer may differ, depending on interfacing applications.

The physical storage space may comprise any appropriate permanent storage medium and include, by way of non-limiting example, one or more disk drives and/or one or more disk units (DUs). The physical storage space comprises a plurality of data blocks, each data block may be characterized by a pair ($DD_{id}$, DBA), and where $DD_{id}$ is a serial number associated with the disk drive accommodating the data block, and DBA is a logical block number within the respective disk. By way of non-limiting example, $DD_{id}$ may represent a serial number internally assigned to the disk drive by the system or, alternatively, a WWN or universal serial number assigned to the disk drive by a vendor. The storage control layer and the storage devices may communicate with the host computers and within the storage system in accordance with any appropriate storage protocol.

Stored data may be logically represented to a client in terms of logical objects. Depending on storage protocol, the logical objects may be logical volumes, data files, multimedia files, snapshots and other copies, etc. For purpose of illustration only, the following description is provided with respect to logical objects represented by logical volumes, Those skilled in the art will readily appreciate that the teachings of the present invention are applicable in a similar manner to other logical objects.

A logical volume (LU) is a virtual entity logically presented to a client as a single virtual storage device. The logical volume represents a plurality of data blocks characterized by successive Logical Block Addresses (LBA) ranging from 0 to a number LUK. Different LUs may comprise different numbers of data blocks, while the data blocks are typically of equal size (e.g. 512 bytes). Blocks with successive LBAs may be grouped into portions that act as basic units for data handling and organization within the system. Thus, for instance, whenever space has to be allocated on a disk or on a memory component in order to store data, this allocation may be done in terms of data portions also referred to hereinafter as "allocation units". Data portions are typically of equal size throughout the system (by way of non-limiting example, the size of data portion may be 64 Kbytes).

The storage control layer may be further configured to facilitate various protection schemes. By way of non-limiting example, data storage formats, such as RAID (Redundant Array of Independent Discs), may be employed to protect data from internal component failures by making copies of data and rebuilding lost or damaged data. As the likelihood for two concurrent failures increases with the growth of disk array sizes and increasing disk densities, data protection may be implemented, by way of non-limiting example, with the RAID 6 data protection scheme well known in the art.

Common to all RAID 6 protection schemes is the use of two parity data portions per several data groups (e.g. using groups of four data portions plus two parity portions in (4+2) protection scheme), the two parities being typically calculated by two different methods. Under one known approach, all n consecutive data portions are gathered to form a RAID group, to which two parity portions are associated. The members of a group as well as their parity portions are typically stored in separate drives. Under a second known approach, protection groups may be arranged as two-dimensional arrays, typically n*n, such that data portions in a given line or column of the array are stored in separate disk drives. In addition, to every row and to every column of the array a parity data portion may be associated. These parity portions are stored in such a way that the parity portion associated with a given column or row in the array resides in a disk drive where no other data portion of the same column or row also resides. Under both approaches, whenever data is written to a data portion in a group, the parity portions are also updated (e.g. using approaches based on XOR or Reed-Solomon algorithms). Whenever a data portion in a group becomes unavailable (e.g. because of disk drive general malfunction, or because of a local problem affecting the portion alone, or because of other reasons), the data can still be recovered with the help of one parity portion via appropriate known in the art techniques. Then, if a second malfunction causes data unavailability in the same drive before the first problem was repaired, data can nevertheless be recovered using the second parity portion and appropriate known in the art techniques.

Successive data portions constituting a logical volume are typically stored in different disk drives (e.g. for purposes of both performance and data protection), and to the extent that it is possible, across different DUs. Typically, definition of LUs in the storage system involves in-advance configuring an allocation scheme and/or allocation function used to determine the location of the various data portions and their associated parity portions across the physical storage medium. Logical contiguity of successive portions and physical contiguity of the storage location allocated to the portions in the system are not necessarily correlated. The allocation scheme may be handled in an allocation module (105) being a part of the storage control layer. The allocation module may be implemented as a centralized module operatively connected to the plurality of storage control devices or may be, at least partly, distributed over a part or all storage control devices.

When receiving a write request from a host, the storage control layer defines a physical location(s) designated for writing the respective data (e.g. in accordance with an allocation scheme, preconfigured rules and policies stored in the allocation module or otherwise). When receiving a read request from the host, the storage control layer defines the physical location(s) of the desired data and further processes the request accordingly. Similarly, the storage control layer issues updates to a given data object to all storage nodes which physically store data related to said data object. The storage control layer is further operable to redirect the request/update to storage device(s) with appropriate storage location(s) irrespective of the specific storage control device receiving I/O request.

For purpose of illustration only, the operation of the storage system is described herein in terms of entire data portions. Those skilled in the art will readily appreciate that the teachings of the present invention are applicable in a similar manner to partial data portions.

Certain embodiments of the present invention are applicable to the architecture of a computer system described with reference to FIG. 1. However, the invention is not bound by the specific architecture, equivalent and/or modified functionality may be consolidated or divided in another manner and may be implemented in any appropriate combination of software, firmware and hardware. Those versed in the art will readily appreciate that the invention is, likewise, applicable to any computer system and any storage architecture implementing a virtualized storage system. In different embodiments of the invention the functional blocks and/or parts thereof may be placed in a single or in multiple geographical locations (including duplication for high-availability); operative connections between the blocks and/or within the blocks may be implemented, directly (e.g. via a bus) or indirectly, including remote connection. The remote connection may be provided via Wire-line, Wireless, cable, Internet, Intranet, power, satellite or other networks and/or using any appropriate communication standard, system and/or protocol and variants or evolution thereof (as, by way of unlimited example, Ethernet, iSCSI, Fiber Channel, etc.). By way of non-limiting example, the invention may be implemented in a SAS grid storage system disclosed in U.S. patent application Ser. No. 12/544,743 filed on Aug. 20, 2009, assigned to the assignee of the present application and incorporated herein by reference in its entirety.

Figure 2:
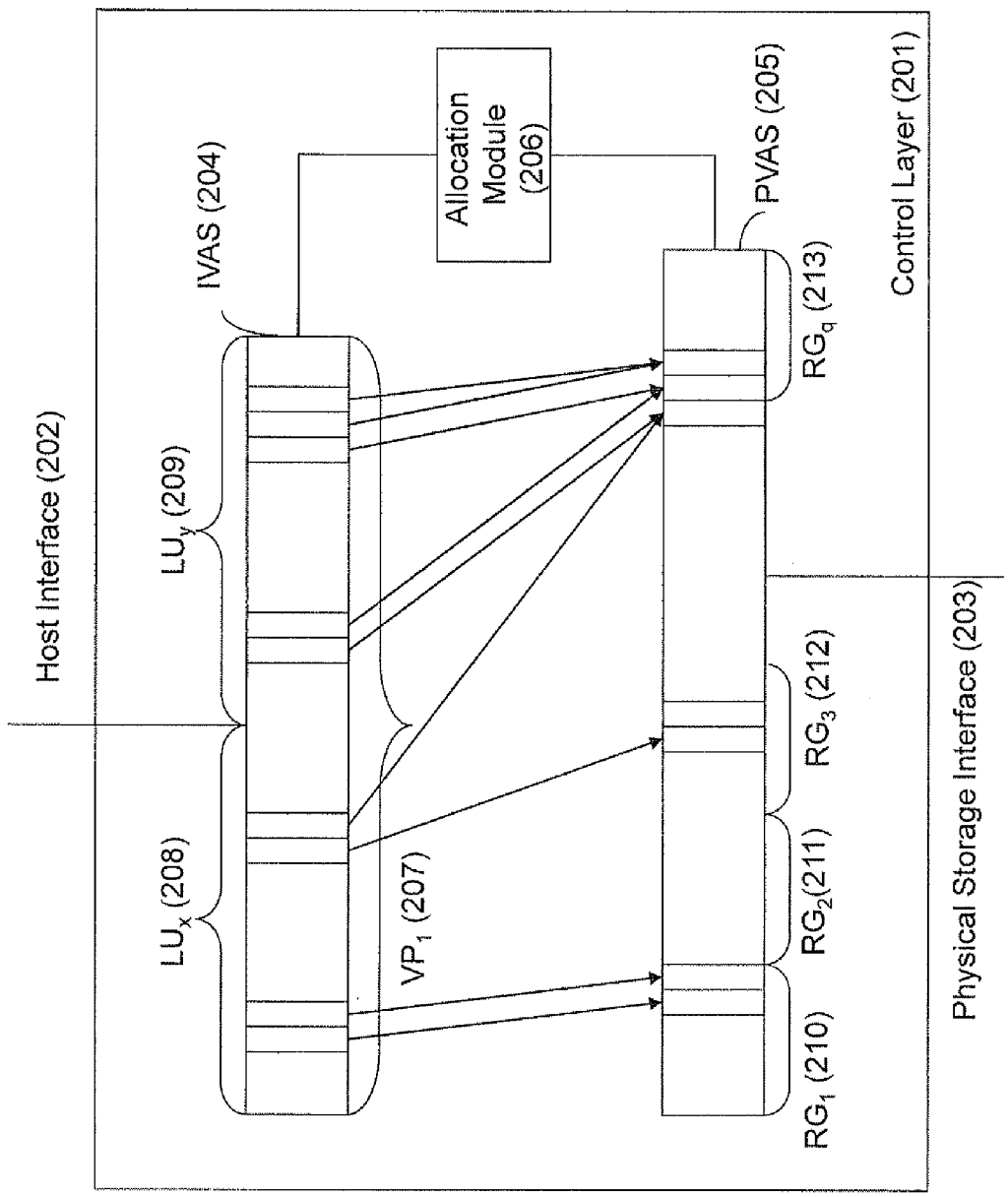
FIG. 2 illustrates a schematic functional block diagram of a control layer configured in accordance with certain embodiments of the present invention.

Referring to FIG. 2, there is schematically illustrated control layer 201 configured in accordance with certain embodiments of the present invention. The virtual presentation of entire physical storage space is provided through creation and management of at least two interconnected virtualization layers: a first virtual layer 204 interfacing via a host interface 202 with elements of the computer system (host computers, etc.) external to the storage system, and a second virtual layer 205 interfacing with the physical storage space via a physical storage interface 203. The first virtual layer 204 is operative to represent logical units available to clients (workstations, applications servers, etc.) and is characterized by an Internal Virtual Address Space (IVAS). The virtual data blocks are represented in IVAS with the help of an internal virtual number of logical block, referred to hereinafter as IBA. The second virtual layer 205 is operative to represent physical storage space available to the clients and is characterized by a Physical Virtual Address Space (PVAS). The virtual data blocks are represented in PVAS with the help of a physical virtual number of logical block referred to hereinafter as PBA. Addresses in IVAS are mapped into addresses in PVAS; while addresses in PVAS, in turn, are mapped into addresses in physical storage space for the stored data. The first virtual layer and the second virtual layer are interconnected, e.g. with the help of the allocation module 206 operative to provide translation from IVAS to PVAS via Internal-to-Physical Virtual Address Mapping.

Each address in the Physical Virtual Address Space has at least one corresponding address in the Internal Virtual Address Space. Managing the Internal Virtual Address Space and Physical Virtual Address Space is provided independently. Such management may be provided with the help of an independently managed IVAS allocation table and a PVAS allocation table. The tables may be accommodated in the allocation module 206 or otherwise, and each table facilitates management of respective space in any appropriate way known in the art.

Among advantages of independent management of IVAS and PVAS is the ability of changing a client's side configuration of the storage system (e.g. new host connections, new snapshot generations, changes in status of exported volumes, etc.), with no changes in meta-data handled in the second virtual layer and/or physical storage space.

It should be noted that, typically in the virtualized storage system, the range of virtual addresses is substantially larger than the respective range of associated physical storage blocks. In accordance with certain embodiments of the present invention, the internal virtual address space (IVAS) characterizing the first virtual layer corresponds to a plurality of logical addresses available to clients in terms of LBAs of LUs. Respective LUs are mapped to IVAS via assignment of IVAS addresses (IBA) to the data portions constituting the LUs and currently available to the client.

By way of non-limiting example, FIG. 2 illustrates a part of the storage control layer corresponding to two LUs illustrated as LUx (208) and LUy (209). The LUs are mapped into the IVAS. In a typical case, initially the storage system assigns to a LU contiguous addresses (IBAs) in IVAS. However, existing LUs may be enlarged, reduced or deleted, and some new ones may be defined during the lifetime of the system. Accordingly, the range of contiguous data blocks associated with the LU may correspond to non-contiguous data blocks assigned in the IVAS.

As will be further detailed with reference to FIGS. 4 and 5, the parameters defining the request in terms of IVAS are further translated into parameters defining the request in the physical virtual address space (PVAS) characterizing the second virtual layer interconnected with the first virtual layer.

Responsive to configuring a logical volume (regular LU, thin volume, snapshot, etc.), the storage system allocates respective addresses in IVAS. For regular LUs the storage system further allocates corresponding addresses in PVAS, wherein allocation of physical addresses is provided responsive to a request to write the respective LU. Optionally, PVAS allocation table may book the space required for LU and account it as unavailable, while actual address allocation in PVAS is provided responsive to respective write request.

As illustrated in FIG. 2, translation of a request in terms of IVAS into request in PVAS terms not necessarily provided in a one-to-one relationship. In accordance with certain embodiments of the invention, several data blocks in the IVAS may correspond to one and the same data block in the PVAS, as for example in a case of snapshots and/or other copy mechanisms which may be implemented in the storage system. By way of non-limiting example, in the case of a snapshot, a source block and a target block in respective snapshot are presented to clients as having different addresses in the IVAS, but they share the same block in the PVAS until the source block (or the target block) is modified for the first time by a write request, at which point two different physical data blocks are produced.

By way of another non-limiting example, in a case of thin volume, each block of the LU is immediately translated into a block in the IVAS, but the association with a block in the PVAS is provided only when actual physical allocation occurs, i.e., only on the first write to corresponding physical block. In the ease of thin volume the storage system does not provide booking of available space in PVAS. Thus, in contrast to a regular volume, thin volumes have no guaranteed available space in PVAS and physical storage space.

The Internal Virtual Address Space (IVAS) characterizing the first virtual layer 204 representing available logical storage space comprises virtual internal addresses (IBAs) ranging from 0 to $2^M$, where M is the number of bits used to express in binary terms the addresses in the IVAS (by way of non-limiting example, in further description we refer to M=56 corresponding to 64-bit address field). Typically, the range of virtual addresses in the IVAS needs to be significantly larger than the range of physical virtual addresses (PBAs) of the Physical Virtual Address Space (PVAS), characterizing the second virtual layer 205 representing available physical storage space.

Usually, in mass storage systems a certain part of the overall physical storage space is defined as not available to a client, so it can be used as a spare space in case of necessity or for other purposes. Accordingly, the range of physical virtual addresses (PBAs) in PVAS may correspond to a certain portion (e.g. 70-80%) of the total physical storage space available on the disk drives. By way of non-limiting example, if a system with raw physical capacity of 160 TB with 30% of this space allocated for spare purposes is considered, then the net capacity will be 113 TB. Therefore, the highest possible address PBA that may be assigned in the PVAS of such a system is about $2^{42}$ ($2^{42} \sim 113*10^{12}$), which is substantially less than the entire range of $2^{56}$ addresses IBA in the IVAS.

As will be further detailed with reference to FIGS. 4-5, at any given point in time, there may be several data blocks in the IVAS corresponding to one data block in the PVAS. Moreover, a significant amount of data blocks in the IVAS may be initially provided to a client without associating with any block in the PVAS, with later association with PVAS only upon actual physical allocation, if at all.

The storage control layer may be further virtualized with the help of one or more virtual partitions (VPs).

By way of non-limiting example, FIG. 2 illustrates only a part of the storage control layer corresponding to a virtual partition $VP_1$ (207) selected among the plurality of VPs corresponding to the control layer. The $VP_1$ (207) comprises several LUs illustrated as LUx (208) and LUy (209). The LUs are mapped into the IVAS. The storage control layer translates a received request (LUN, LBA, block_count) into requests (VPid, IBA, block_count) defined in the IVAS. In a typical case, initially the storage system assigns to a LU contiguous addresses (IBAs) in the IVAS. However, existing LUs may be enlarged, reduced or deleted, and some new ones may be defined during the lifetime of the system. Accordingly, the range of contiguous data blocks associated with the LU may correspond to non-contiguous data blocks assigned in the IVAS: (VPid, IBA1, block_count1), (VPid, IBA2, block_count2), etc. Unless specifically stated otherwise, referring to hereinafter the parameter (VPid, IBA, block_count) may also include referring to the two or more parameters (VPid, IBA$_i$, block_count$_i$).

In accordance with certain embodiments of the present invention, the parameters (VPid, IBA, block_count) that define the request in IVAS are further translated into (VPid, PBA, block_count) defining the request in the physical virtual address space (PVAS) characterizing the second virtual layer interconnected with the first virtual layer.

For purpose of illustration only, the following description is made with respect to RAID 6 architecture. Those skilled in the art will readily appreciate that the teachings of the present invention are not bound by RAID 6 and are applicable in a similar manner to other RAID technology in a variety of implementations and form factors.

Figure 3:
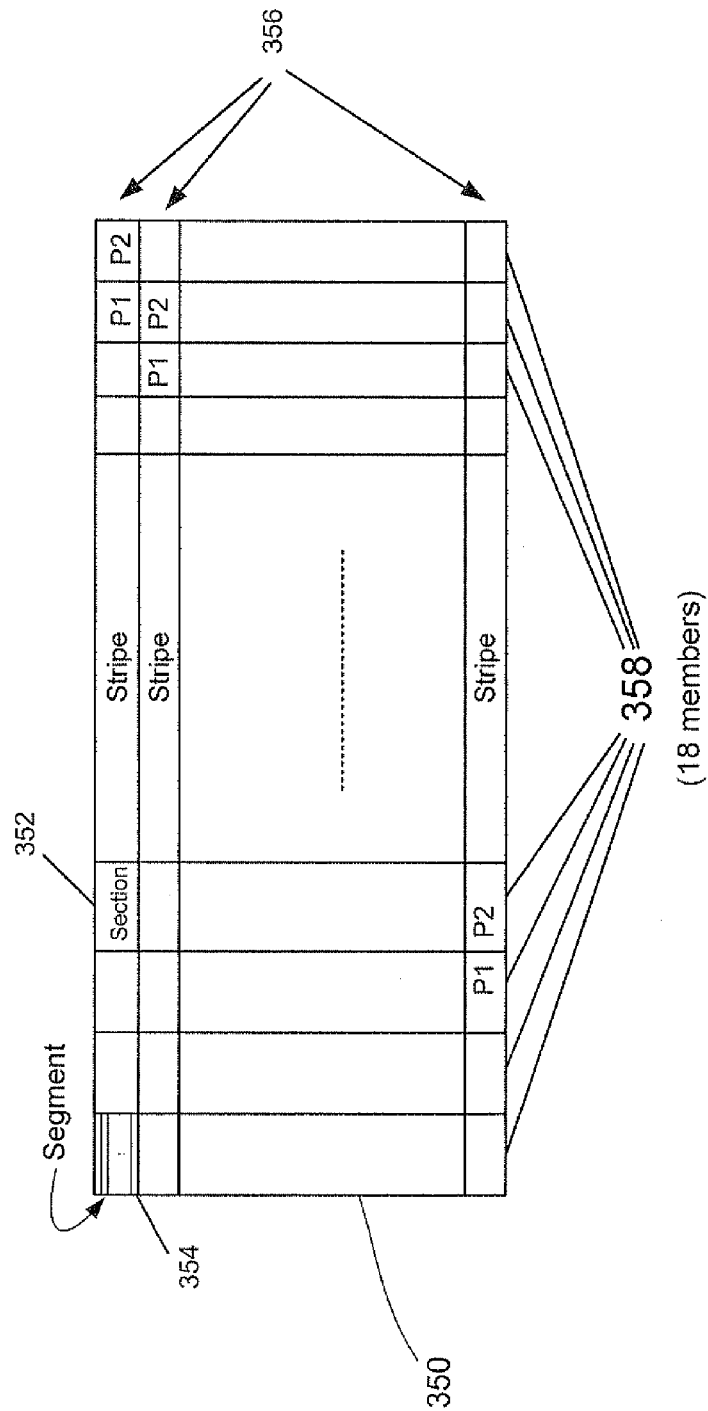
FIG. 3 illustrates a schematic diagram of physical storage space configured in RAID group as known in the art.

The physical storage space may be configured as RAID groups concatenation as further illustrated in FIG. 3. Accordingly, as illustrated in FIG. 2, the second virtual layer 205 representing the physical storage space may be also configured as a concatenation of RAID Groups (RGs) illustrated as RG$_1$ (210) to RGq (213). Each RAID group comprises a set of contiguous data blocks, and the address of each such block may be identified as (RGid, RBA), by reference to the RAID group RGid and a RAID, logical block number RBA within the group.

Referring to FIG. 3, there is illustrated a schematic diagram of physical storage space configured in RAID groups as known in the art. A RAID group (350) may be built as a concatenation of stripes (356), the stripe being a complete (connected) set of data and parity elements that are dependently related by parity computation relations. In other words, the stripe is the unit within which the RAID write and recovery algorithms are performed in the system. A stripe comprises N+2 sections (352), the sections being the intersection of a stripe with a member (356) of the RAID group. A typical size of the sections is 64 KByte (or 128 blocks). Each section is further sub-divided into 16 segments (354) each of 4 Kbyte (or 8 blocks). Sections and segments are used to calculate the two parity sections associated with each stripe. In our example, with N=16, and with a typical size of 4 GB for each group member, the RAID group may typically comprise (4*16=) 64 GB of data. A typical size of the RAID group, including the parity blocks, may be of (4*18=) 72 GB.

Each RG comprises n+2 members, MEMi (0≤i≤n+1), with n being the number of data portions per RG (e.g. n=16). The storage system is configured to allocate data associated with the RAID groups over various physical drives. The physical drives need not be identical. For purposes of allocation, each PD may be divided into successive logical drives (LDs). The allocation scheme may be accommodated in the allocation module.

Figure 4:
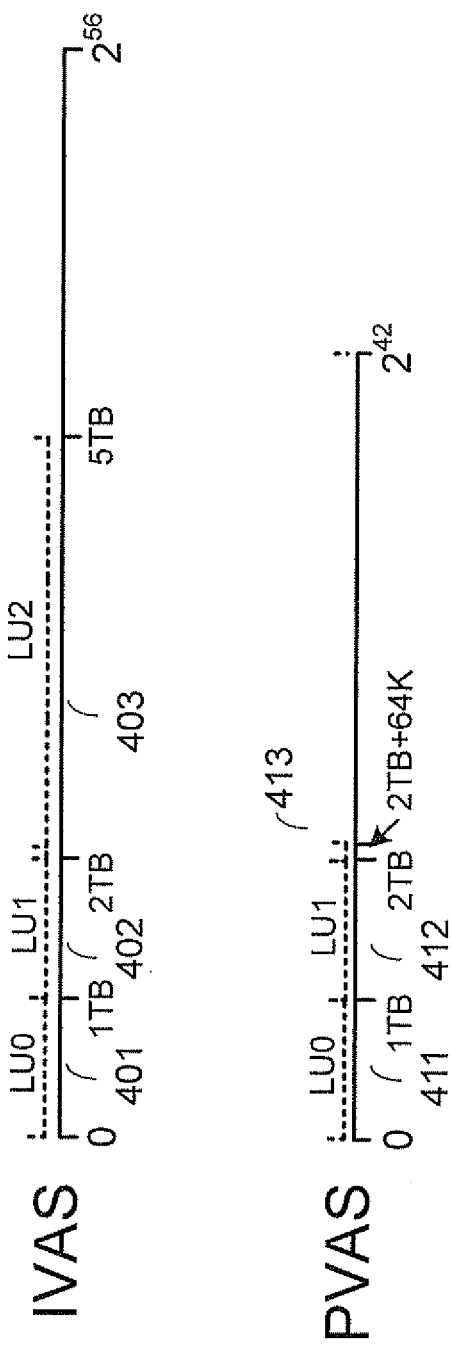
FIG. 4 illustrates a schematic diagram of representing exemplified logical volumes in the virtual layers in accordance with certain embodiments of the present invention.

Referring to FIG. 4, there is schematically illustrated translation from IVAS to PVAS in accordance with certain embodiments of the present invention.

As has been detailed with reference to FIG. 2, IO requests are handled at the level of the PVAS in terms of (VPid, PBA, block_count). As PVAS represents concatenation of RGs, such requests may be further translated in terms of the relevant RAID groups as (RGid, RBA, block_count) and from there in terms of physical address on the disks, as (DDid, DBA, block_count), assigned to the RAID groups in accordance with an allocation scheme. However, the translation is provided still at the PVAS level, wherein the actual allocation of physical storage space for a certain RAID group is provided responsive to an arriving first write request directed to this group. A Utilization Bitmap of the physical storage space indicates which RAID groups have already been allocated.

It should also be noted that certain additional data protection mechanisms (as, for example, "Data Integrity Field" (DIF) or similar ones) handled only at a host and at the RAID group, may be passed transparently over the virtualization layers.

The schematic diagram in FIG. 4 illustrates representing exemplified logical volumes in the virtual layers in accordance with certain embodiments of the present invention. In the illustrated case the user has defined two logical volumes LU0, LU1, each of 1 TB size, and logical volume LU2 of 3 TB size. The logical volumes have been respectively mapped in IVAS as ranges 401, 402 and 403. The IVAS allocation table (illustrated in FIG. 5) is updated accordingly.

Logical Volumes LU0 and LU1 have been configured as regular volumes, while the logical volume LU2 has been configured as a thin logical device (or dynamically allocated logical device). Accordingly, ranges 401 and 402 in IVAS have been provided with respective allocated 1 TB ranges 411 and 412 in PVAS, while no allocation has been provided in PVAS with respect to the range 403. As will be further detailed in connection with Request 3, allocation 413 in PVAS for LU2 will be provided responsive to respective write requests. PVAS allocation table (illustrated in FIG. 5) is updated accordingly upon allocation of ranges 411 and 412, and upon respective writes corresponding to LU2.

Figure 5:
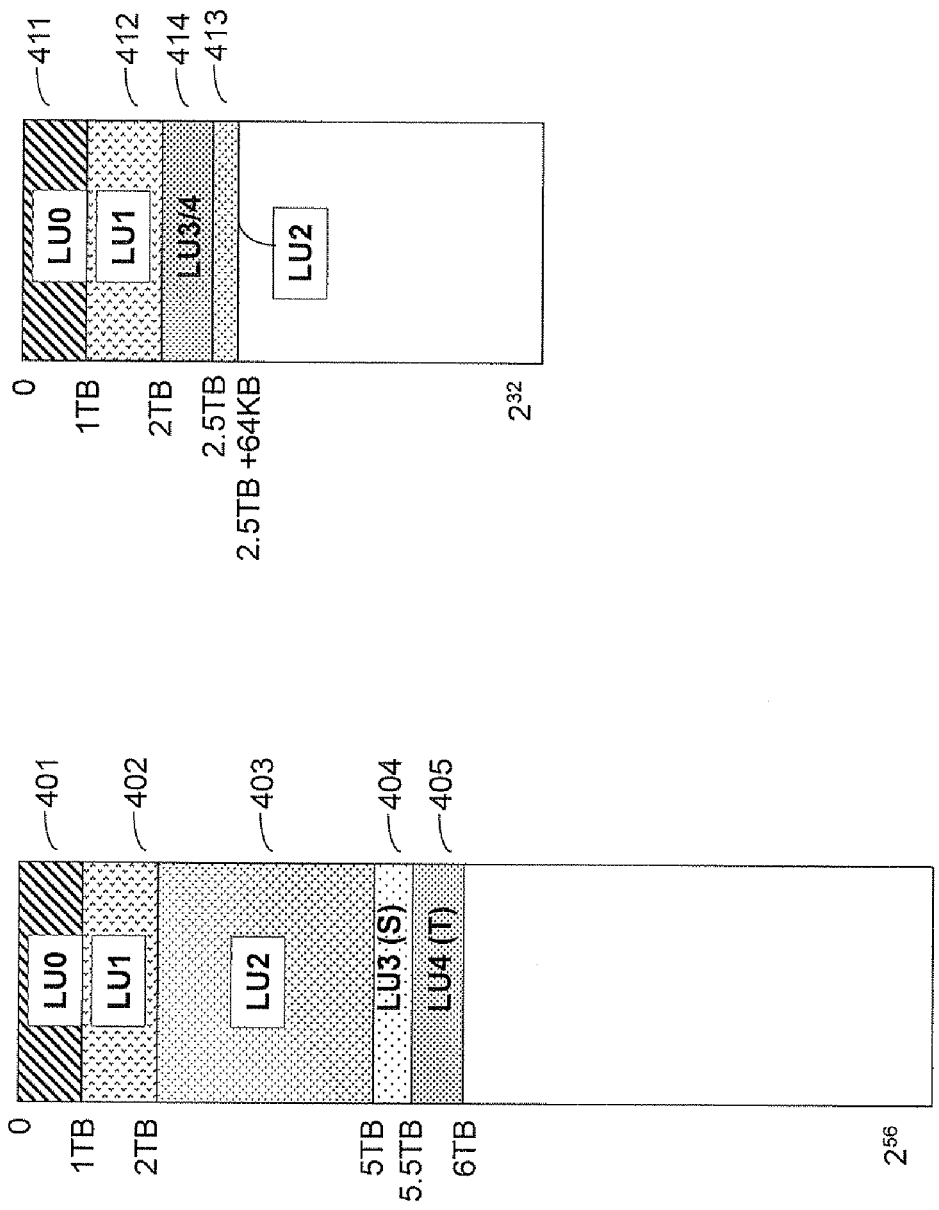
FIG. 5 illustrates a schematic diagram of IVAS and PVAS Allocation Tables in accordance with certain embodiments of the present invention.

FIG. 5 schematically illustrates IVAS and PVAS Allocation Tables for exemplified logical volumes. Further to the example illustrated in FIG. 4, in the case illustrated in FIG. 5 the user has defined logical volume LU3 of 0.5 TB size and then has generated a snapshot of LU3, here defined as logical volume LU4 (with the same size). Accordingly, IVAS allocation table illustrates allocations of respective ranges 401-405 in IVAS. Ranges 401 and 402 have corresponding ranges 411 and 412 allocated in the PVAS allocation table. Ranges 404 and 405 in IVAS correspond to a common range 414 allocated in PVAS. The source volume LU3 and the target volume LU4 of the respective snapshot are presented to clients as having different addresses in the IVAS (404 and 405 respectively), but they share the same addresses (414) in the PVAS until the source or the target is modified for the first time by a write request, at which point a respective new range will be allocated in PVAS. Allocation 413 for LU2 is provided in the PVAS allocation table upon receiving respective write request (in the illustrated case after allocation of 414). Responsive to further write requests, further allocations for LU2 may be provided at respectively available addresses with no need of in-advance reservations in PVAS.

Hence, the total space allocated for volumes LU0-LU4 in IVAS is 6 TB, and respective space allocated in PVAS is 2.5 TB+64 KB.

Table 1 illustrates non-limiting examples of IO requests to the above exemplified logical volumes in terms of host and the virtualization layers. For simplicity the requests are described without indicating VPs to which they may be directed.

TABLE 1

|  | Host layer | 1st virtualization layer (IVAS) | 2nd virtualization layer (PVAS) |
|---|---|---|---|
| Request 1 | (LU0, 200 GB, 100 GB) | (0 + 200 GB, 100 GB) | (0 + 200 GB, 100 GB) |
| Request 2 | (LU1, 200 GB, 100 GB) | (1 TB + 200 GB, 100 GB) | (1 TB + 200 GB, 100 GB) |
| Request 3 | (LU2, 0, 64 KB) | (2 TB + 0, 64 KB) | (2, 5 TB + 0, 64 KB) |
| Request 4 | (LU3, 50 GB, 100 GB) | (5 TB + 50 GB, 100 GB) | (2 TB + 50 GB, 100 GB) |
| Request 5 | (LU4, 10 GB, 50 GB) | (5.5 TB + 10 GB, 50 GB) | (2 TB + 10 GB, 50 GB) |

Request 1 is issued by a host as a request to LU0. Its initial offset within the LU0 is 200 GB, and its length is 100 GB. Since LU0 starts in the IVAS at offset 0, the request is translated in IVAS terms as a request to offset 0+200 GB, with length 100 GB. With the help of Internal-to-Physical Virtual Address Mapping the request is translated in terms of PVAS as a request starting at offset 0+200 (0 being the offset representing in the PVAS offset 0 of the IVAS), and with length 100 GB.

Similarly, Request 2 is issued by a host as a request to LU1. Its initial offset within the LU1 is 200 GB, and its length is 100 GB. Since LU1 starts in the IVAS at offset 1 TB, the request is translated in IVAS terms as a request to offset 1 TB+200 GB, with length 100 GB. With the help of Internal-to-Physical Virtual Address Mapping this request is translated in terms of PVAS as a request starting at 1 TB+200 GB (1 TB being the offset representing in the PVAS offset 1 TB of the IVAS), and with length 100 GB.

Request 3 is issued by a host as a first writing request to LU2 to write 64K of data at offset 0. As LU2 is configured as a thin volume, it is represented in IVAS by the address range 2 TB-5 TB, but has no pre-allocation in PVAS. Since LU2 starts in the IVAS at offset 2 TB, the request is translated in IVAS terms as a request to offset 2 TB+0, with length 64 KB. As there were no pre-allocation to LU2 in PVAS, the allocation module checks available PVAS address in PVAS allocation table (2.5 TB in the illustrated case) and translates the request in terms of PVAS as a request starting at 0+2.5 TB and with length 64 KB.

Request 4 is issued by a host as a read request to LU3 (source volume) to read 100 GB of data at offset 50 G. Since LU3 starts in the IVAS at offset 5 TB, the request is translated in IVAS terms as a request to offset 5 TB+50 GB, with length 100 GB. With the help of Internal-to-Physical Virtual Address Mapping this request is translated in terms of PVAS as a request starting at 2 TB+50 GB (2 TB being the offset representing in the PVAS offset 2 TB of the IVAS), and with length 100 GB.

Request 5 is issued by a host as a read request to LU4 (target volume) to read 50 GB of data at offset 10 G. Since LU4 starts in the IVAS at offset 5.5 TB, the request is translated in IVAS terms as a request to offset 5.5 TB+10 GB, with length 50 GB. With the help of Internal-to-Physical Virtual Address Mapping this request is translated in terms of PVAS as a request starting at 2 TB+10 GB (2 TB being the offset representing in the PVAS offset 2 TB of the IVAS), and with length 50 GB.

It should be noted that Request 4 and Request 5 directed to a source and a target (snapshot) volumes correspond to different ranges (404 and 405) in IVAS, but to the same range in PVAS (until LU3 or LU4 are first modified and are provided by a correspondent allocation in PVAS).

It should be also noted that, as illustrated, the requests handled at IVAS and PVAS levels do not comprise any reference to logical volumes requested by hosts. Accordingly, the control layer configured in accordance with certain embodiments of the present invention enables to handle, in a uniform manner, various logical objects (LUs, files, etc.) requested by hosts, thus facilitating simultaneous support of various storage protocols. The first virtual layer interfacing with clients is configured to provide necessary translation of IO requests, while the second virtual layer and the physical storage space are configured to operate in a protocol-independent manner. Accordingly, in a case of further virtualization with the help of virtual partitions, each virtual partition may be adapted to operate in accordance with its own protocol (e.g. SAN, NAS, OAS, CAS, etc.) independently from protocols used by other partitions.

The control layer configured in accordance with certain embodiments of the present invention further facilitates independent configuring protection of each virtual partition. Protection for each virtual machine may be configured independently from other partitions in accordance with individual protection schemes (e.g. RAID1, RAID5, RAID6, etc.) The protection scheme of certain VP may be changed with no need in changes at the client's side configuration of the storage system.

By way of non-limiting example, the control layer may be divided into six virtual partitions so that VP0 and VP3 use RAID1, VP1 and VP4 use RAID 5, and VP2 and VP6 use RAID 6 protection schemes. All RGs of the certain VP are handled according to the stipulated protection level. When configuring a LU, a user is allowed to select a protection scheme to be used, and to assign the LU to a VP that provides that level of protection. The distribution of system resources (e.g. physical storage space) between the virtual partitions may be predefined (e.g. equally for each VP). Alternatively, the storage system may be configured to account the disk space already assigned for use by the allocated RGs and, responsive to configuring a new LU, to check if available resources for accepting the volume exist, in accordance with the required protection scheme. If the available resources are insufficient for the required protection scheme, the system may provide a respective alert. Thus, certain embodiments of the present invention enable dynamic allocation of resources required for protecting different VPs.

Referring back to FIG. 5, the IVAS and PVAS Allocation Tables may be handled as independent linked lists of used ranges. The tables may be used for deleting LUs and de-allocating the respective space. For example, deleting LU1 requires indicating in the IVAS Allocation Table that ranges 0-1 TB and 2-6 TB are allocated, and the rest is free, and at the same time indicating in the PVAS Allocation Table that ranges 0-1 TB and 2-2.5 TB+64 KB are allocated, and the rest is free. Deleting LU3, requires indicating in the IVAS Allocation Table that ranges 0-5 TB and 5.5-6 TB are allocated, and the rest is free, while the PVAS Allocation Table will remain unchanged.

In certain embodiments of the present invention, deleting a logical volume can be done by combining two separate processes: an atomic process (that performs changes in the IVAS and its allocation table) and a background process (that performs changes in the PVAS and its allocation table). Atomic deletion process is a "zero-time" process enabling deleting the range allocated to the LU in the IVAS Allocation Table. The LU number may remain in the table but there is no range of addresses associated with it. This means that the volume is not active, and an IO request addressed at it cannot be processed. The respective range of IVAS addresses is de-allocated and it is readily available for new allocations. Background deletion process is a process which can be performed gradually in the background in accordance with preference levels determined by the storage system in consideration of various parameters. The process scans the PVAS in order to de-allocate all ranges corresponding to the ranges deleted in the IVAS Allocation Table during the corresponding atomic process, while updating Utilization Bitmap of the physical storage space if necessary. Likewise, during this background process, the Internal-to-Physical Virtual Address Mapping is updated, so as to eliminate all references to the IVAS and PVAS just de-allocated.

If an LU comprises more than one range of contiguous addresses in IVAS, the above combination of processes is provided for each range of contiguous addresses in IVAS.

As was illustrated with reference to FIG. 5, the IVAS-based step of deleting process may be provided without the PVAS-based step. For example, a non-allocated at physical level snapshot or thin volume may be deleted from IVAS, with no need in any changes in PVAS and/or physical storage space, as there were no respective allocations.

In accordance with certain embodiments of the invention, there is further provided a functionality of "virtual deleting" of a logical volume defined in the system. When a user issues a "virtual deleting" for a given LU in the system, the system may perform the atomic phase of the deletion process (as described above) for that LU, so that the LU is de-allocated from the IVAS and is made unavailable to clients. However, the background deletion process is delayed, so that the allocations in IVAS and PVAS (and, accordingly, physical space) and the Internal-to-Physical Virtual Address Mapping are kept temporarily unchanged. Accordingly, as long as the background process is not effective, the user may instantly un-delete the virtually deleted LU, by just re-configuring the respective LU in IVAS as "undeleted". Likewise, the "virtual deleting" may be implemented for snapshots and other logical objects.

The metadata characterizing the allocations in IVAS and PVAS may be kept in the system in accordance with pre-defined policies. Thus, for instance, the system may be adapted to perform the background deletion process (as described above) 24 hours after the atomic phase was completed for the LU. In certain embodiments of the invention the period of time established for initiating the background deletion process may be adapted to different types of clients (e.g. longer times for VIP users, longer types for VIP applications, etc.). Likewise, the period may be dynamically adapted for individual volumes or be system-wide, according to availability of resources in the storage system, etc.

It should be noted that the above described storage system and method of operating thereof can be used in the framework of SAN, NAS, or any other kind of data storage approach.

It is to be understood that the invention is not limited in its application to the details set forth in the description contained herein or illustrated in the drawings. The invention is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the present invention.

It will also be understood that the system according to the invention may be a suitably programmed computer. Likewise, the invention contemplates a computer program being readable by a computer for executing the method of the invention. The invention further contemplates a machine-readable memory tangibly embodying a program of instructions executable by the machine for executing the method of the invention.

Those skilled in the art will readily appreciate that various modifications and changes can be applied to the embodiments of the invention as hereinbefore described without departing from its scope, defined in and by the claims associated with the present invention.

The invention claimed is:

1. A storage system comprising a plurality of physical storage devices controlled by a plurality of storage control devices constituting a storage control layer, said layer operatively coupled to a plurality of hosts and the plurality of physical storage devices constituting a physical storage space, wherein the storage control layer is operable to handle a virtual representation of the physical storage space and comprises:
   a) a first virtual layer interfacing with the plurality of hosts, operable to represent a logical address space characterized by logical block addresses and available to said plurality of hosts, said first virtual layer characterized by an Internal Virtual Address Space (IVAS);
   b) a second virtual layer characterized by a Physical Virtual Address Space (PVAS), interfacing with the physical storage space constituted by the plurality of physical storage devices, and operable to represent an actual physical storage space available to said plurality of hosts within the physical storage space; and
   c) an allocation module operatively coupled to the first virtual layer and to the second virtual layer and operable to provide mapping between Internal Virtual Address Space and Physical Virtual Address Space wherein each address in said Physical Virtual Address Space is configured to have at least one corresponding address in said Internal Virtual Address Space;
   wherein the storage system is further operable to configure a source object and its at least one snapshot to be allocated to different addresses in IVAS, while sharing the same allocated addresses in the PVAS until either the source object or the respective snapshot are modified by a write request.

2. The storage system of claim 1 wherein Internal Virtual Address Space and Physical Virtual Address Space are managed independently of each other.

3. The storage system of claim 1 wherein Internal Virtual Address Space and Physical Virtual Address Space are managed with the help of independently handled an IVAS allocation table and a PVAS allocation table.

4. The storage system of claim 1 further configured, responsive to configuring a logical volume, to allocate respective addresses in IVAS.

5. The storage system of claim 1 further configured, responsive to allocating a certain range of addresses in IVAS, to book in PVAS the space required for said certain range of addresses, thereby accounting this space as unavailable, wherein providing allocation of actual addresses in PVAS responsive to respective write request.

6. The storage system of claim 1 further configured, responsive to configuring a given logical volume, to allocate respective addresses in IVAS and PVAS, wherein the storage system is further configured to allocate a corresponding range of addresses in physical storage space merely responsive to a requests to write the given logical volume.

7. The storage system of claim 1 wherein one and the same address in PVAS corresponds to a plurality of addresses in IVAS.

8. The storage system of claim 1 wherein PVAS is configured to represent a concatenation RAID Groups distributed over the storage devices.

9. The storage system of claim 1 is further operable, in a case of using a thin volume, to dynamically allocate address space in PVAS responsive to a write request corresponding to respective addresses allocated for the thin volume in IVAS.

10. A method of operating a storage system comprising a plurality of physical storage devices constituting a physical storage space and controlled by a plurality of storage control devices constituting a storage control layer, said layer operatively coupled to a plurality of hosts and the plurality of physical storage devices, and is operable to handle a virtual representation of the physical storage space, the method comprising:
    generating in the storage control layer a first virtual layer interfacing with the plurality of hosts and characterized by a Internal Virtual Address Space (IVAS), and a second virtual layer interfacing with the physical storage space constituted by the plurality of physical storage devices and characterized by Physical Virtual Address Space (PVAS);
    representing, with the help of the first virtual layer, logical address space characterized by logical block addresses and available to said plurality of hosts, and representing, with the help of the second virtual layer, actual physical space available to said plurality of hosts; and
    providing mapping between Internal Virtual Address Space and Physical Virtual Address Space, wherein each address in said Physical Virtual Address Space is configured to have at least one corresponding address in the Internal Virtual Address Space;
    generating at least one snapshot with respect to a source object;
    allocating to said at least one snapshot and said source object different addresses in IVAS, whilst allocating common addresses in the PVAS; and
    responsive to modification of said source object or said snapshot by a respective write request, allocating new addresses in PVAS to, respectively, the modified source object or the modified snapshot.

11. The method of claim 10 wherein Internal Virtual Address Space and Physical Virtual Address Space are managed independently of each other.

12. The method of claim 10 wherein Internal Virtual Address Space and Physical Virtual Address Space are managed with the help of independently handled an IVAS allocation table and a PVAS allocation table.

13. The method of claim 10 wherein one and the same address in PVAS corresponds to a plurality of addresses in IVAS.

14. The method of claim 10 further comprising dynamic allocating of address space in PVAS responsive to a write request corresponding to respective addresses allocated in IVAS.

* * * * *